(12) United States Patent  
Zhang et al.

(10) Patent No.: US 9,088,219 B2  
(45) Date of Patent: Jul. 21, 2015

(54) DUAL-MODE, AC/DC POWER CONVERTER WITH POWER FACTOR CORRECTION

(71) Applicant: Atmel Corporation, San Jose, CA (US)

(72) Inventors: Hong Zhang, Mountain View, CA (US); Sean S. Chen, Sunnyvale, CA (US); Dilip Sangam, Saratoga, CA (US)

(73) Assignee: Atmel Corporation, San Jose, CA (US)

( * ) Notice: Subject to any disclaimer, the term of this patent is extended or adjusted under 35 U.S.C. 154(b) by 222 days.

(21) Appl. No.: 13/691,088

(22) Filed: Nov. 30, 2012

(65) Prior Publication Data

US 2014/0153291 A1 Jun. 5, 2014

(51) Int. Cl.  
*H02M 3/335* (2006.01)  
*H02M 1/42* (2007.01)  
*H05B 33/08* (2006.01)

(52) U.S. Cl.  
CPC ........ *H02M 3/33507* (2013.01); *H02M 1/4258* (2013.01); *H05B 33/0809* (2013.01); *Y02B 70/126* (2013.01)

(58) Field of Classification Search  
USPC ......... 363/15, 18, 21.04, 21.05, 21.07, 21.08, 363/21.09, 21.1, 21.11, 21.12, 21.13, 21.15, 363/21.16, 21.17, 21.18, 89  
See application file for complete search history.

(56) References Cited

U.S. PATENT DOCUMENTS

| | | | |
|---|---|---|---|
| 7,826,237 B2 * | 11/2010 | Zhang et al. | 363/21.12 |
| 8,207,713 B2 * | 6/2012 | Sugawara | 323/222 |
| 8,373,397 B2 * | 2/2013 | Tanifuji et al. | 323/271 |
| 8,536,851 B2 * | 9/2013 | Lin et al. | 323/300 |
| 2011/0157922 A1 * | 6/2011 | Konecny et al. | 363/21.12 |

* cited by examiner

*Primary Examiner* — Nguyen Tran  
(74) *Attorney, Agent, or Firm* — Fish & Richardson P.C.

(57) ABSTRACT

A dual-mode circuit for the control of an AC/DC power converter is disclosed. An example dual-mode controller circuit generates a waveform that drives a switch on or off and controls the power converter. The controller circuit in addition to power factor correction (PFC) circuitry includes a critical conducting mode (CrM) module as well as a discontinuous conducting mode (DCM) module configured to generate waveforms adapted for CrM and DCM operation of a power converter. The circuit includes a node for receiving a feedback signal of a voltage or a current. Based on the received signal, one of the modules is selected at a time to supply the waveform at the output of the dual-mode controller. An example of the output waveform is a series of pulses that are configured to drive the switch that controls the transfer of power between input and output of the power converter.

30 Claims, 6 Drawing Sheets

DUAL-MODE, AC/DC POWER CONVERTER WITH POWER FACTOR CORRECTION

TECHNICAL FIELD

This disclosure relates generally to electronics and more specifically to the output control of AC/DC power converters with Power Factor Correction (PFC) circuits for driving light emitting devices, such as Light Emitting Diode (LED).

BACKGROUND

An AC/DC power converter is used to drive a string of LEDs. The AC/DC power converter includes a rectifier circuit for rectifying an AC input voltage into a DC voltage. The isolated AC/DC power converter includes a transformer and isolates the output (secondary side) from the input (primary side) of the converter and therefore separate grounds are used for the input and the output of the isolated converter circuit. If an inductor replaces the transformer of the AC/DC power converter, the input and the output of the converter do not become isolated and share the same ground. The AC/DC power converter includes PFC circuitry in the primary controller that controls the input current so that the input current waveform is in phase with the waveform of the AC input voltage (e.g., a sine wave). For a good power factor, the input current waveform will follow the shape and phase of the input voltage.

The isolated AC/DC power converters include controllers to modify the brightness of the string of LEDs. The brightness control is either implemented from the secondary side of the transformer or solely from the primary side or the transformer. The method of controlling the LED lighting form the secondary side is more accurate and uses a secondary LED controller incorporated in the secondary side of the transformer and adapted to set the LED current and measure the LEDs' current and/or voltage. In this method, there also exists a primary side controller that in addition to satisfying PFC requirements, receives the secondary controller's data and causes the necessary changes for the output. The output load varies a wide range when changing the brightness of the LEDs. This requires the AC/DC power converter to be able to operate under full load conditions as well as under light load conditions.

Power converters generally incorporate two modes of operation when dealing with heavy as well as light loads. In Critical Conduction Mode (CrM) the switching converter initiates a new switching cycle immediately after the inductor current in the switching converter goes to zero. In Discontinuous Conduction Mode (DCM) the switching converter initiates a new switching cycle much after the inductor current goes to zero and is typically used for light loads. The CrM is preferred over the DCM because a smaller switching transistor and a smaller transformer are used. The CrM is commonly selected for full or heavy loads but the load range for the CrM is limited and for further light loads the DCM is preferred.

SUMMARY

The output control of an AC/DC power converter using a dual-mode controller is disclosed. An example dual-mode controller circuit is coupled to a PFC circuitry and provides driving waveforms for turning a switch on or off in the power converter. The circuit includes two modules for creating the driving waveforms. The first module is a CrM module that is configured to generate a waveform adapted for the power converter to operate under CrM and the second one is a DCM module that is configured to generate a waveform adapted for the power converter to operate under DCM. The controller circuit includes a feedback node for receiving a feedback signal in the form of a voltage or current. A criterion voltage is generated from the feedback signal and used to select one of the CrM or the DCM modules to provide the waveform at the output of the circuit. The criterion voltage, which is a measure of the error, is also coupled to the inputs of the CrM and DCM modules and is used to adjust the waveforms generated by each module. Finally the output of the selected CrM or DCM module is delivered at the output of the dual-mode PFC controller.

In another aspect, an example isolated AC/DC power converter circuit includes a primary side and a secondary side inductively coupled through a transformer, and has different grounds for the primary and the secondary sides. The power converter also includes a dual-mode primary controller with the PFC circuitry and a secondary controller at the output of the power converter that provides an output error signal. A rectifying circuit receives an alternating input voltage and produces a rectified voltage. The rectified voltage is coupled to the primary side of the transformer where the primary side is coupled through a switch to the primary side ground. The secondary side of the transformer is coupled to an output load. The dual-mode primary controller circuit receives the error signal from the secondary controller and based on the error, provides the output waveform of one of the CrM or the DCM modules at its output to turn the switch on and off, and control the follow of current through the primary of the transformer.

An example method is the delivering of a waveform by a dual-mode controller to turn a switch on and off. The controller is configured to generate two different output waveforms. The first output waveform is designed for operating a power converter in CrM and the second output waveform is designed for operating a power converter in DCM. The circuit receives a feedback signal in the form of a voltage or current and constructs a criterion voltage from the feedback signal. Based on the criterion voltage one of the CrM or DCM modules is selected for generating the output waveform to be delivered at the output of the controller.

Another example method is controlling an isolated AC/DC power converter. An alternating input voltage is rectified and applied to the primary of the transformer. The primary side is controlled by a dual-mode primary controller that generates either a waveform adapted for CrM operation of a power converter or another waveform adapted for DCM operation of a power converter. The primary controller provides the waveform to a switch where the switch is also coupled to the primary side of the transformer. The secondary side of the transformer drives the output load and, through a secondary controller, provides an output error signal to the primary controller. The primary controller uses this error signal to generate a criterion voltage and based on the criterion voltage, diverts one of the output waveforms of the CrM or the DCM modules to the switch and controls the amount of energy that is transferred from the primary side to the secondary side.

Particular implementations of a PFC controller circuit that integrates both CrM and DCM modes of operation into one circuit can operate under heavy output loads as well as light output loads. The AC/DC power converter that incorporates this circuit supports a wide load range, utilizing the CrM for heavy loads and the DCM for light loads while smoothly transitioning between the modes. As an example, the controller circuit is implemented in an integrated circuit chip and controls the lighting of a LED diode string. Another implementation of the controller circuit includes an on-time skew module. The on-time skew module modifies the output waveform of the CrM module or the DCM module where the modification includes a change of the time a switch coupled to the output of the controller circuit is turned on. Utilizing the on-time skew module increases the dynamic range for the output control.

DETAILED DESCRIPTION

Figure 1:
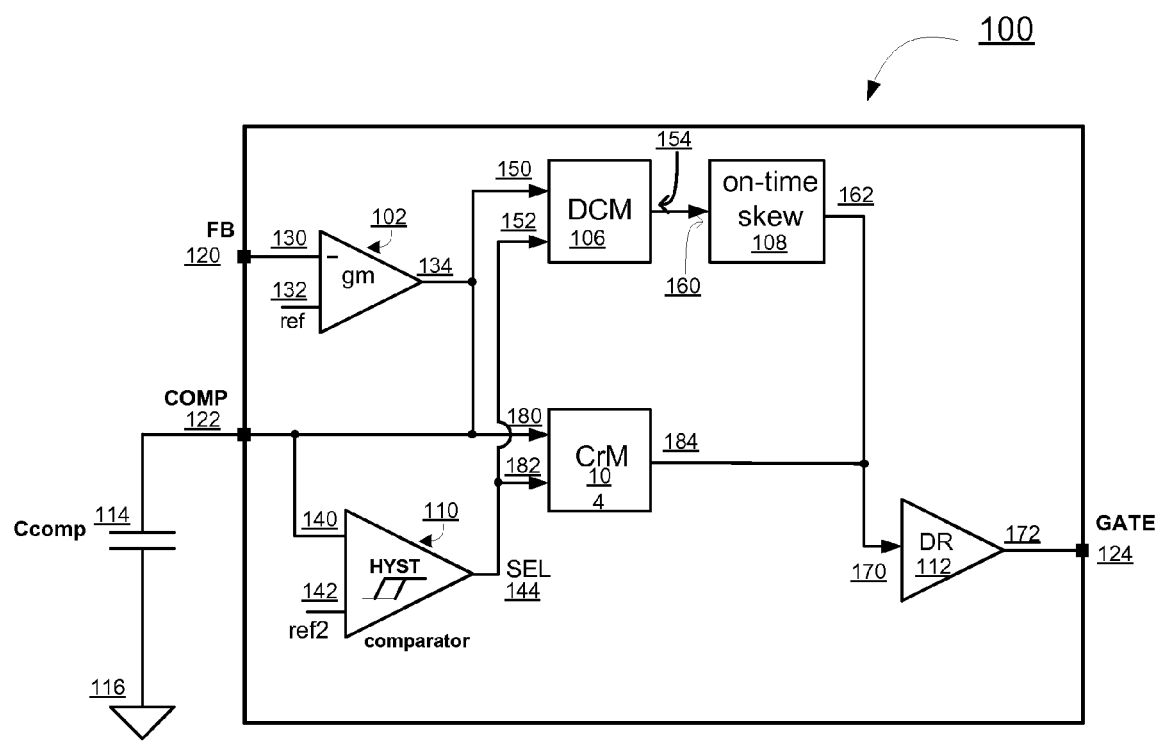
FIG. 1 is a circuit diagram of example circuits that are coupled to an existing PFC circuit to create a dual-mode controller.

FIG. 1 is an example circuit 100 designed to produce output waveforms for controlling an AC/DC power converter. An isolated power converter utilizes a transformer (not shown) between the input and the output of the power converter. The circuit 100, as the primary controller, regulates the flow of current in the primary side of the transformer. The characteristics of the waveform generated by the primary controller that drives a switch coupled to the primary of the transformer on or off determines the amount of energy transferred from the input to the output. The circuit 100 is also used for AC/DC power converters where the input and output of the converter are not isolated. The circuit 100 can be included in any power converter and by modifying the output waveform of the circuit 100 the output of the converter is controlled. An example of the output waveform is a series of pulses where the frequency and the duty cycle are the parameters to control the flow of energy. As another example is the utilization of a pulse width modulation (PWM) scheme for the output waveform.

The dual-mode circuit 100 includes a CrM module 104 that produces a first waveform (e.g., a series of pulses) suitable when the converter is driving a heavy load and a DCM module 106 that produces a second waveform (e.g., a series of pulses) suitable for the operation of the power converter under light loads. The modules 104 and 106 are configured to generate waveforms adapted to comply with PFC requirements. The circuit 100 receives a feedback signal through its FB node 120. The received error is applied to inverting input 130 of an integrator 102 where a first reference signal is also applied to its non-inverting input 132. The difference of the two inputs of 102 are integrated and delivered to the output 134. In another example, integrator 102 additionally amplifies the output. The output 134 is coupled to input 150 of DCM module and input 180 of CrM module as well as the circuit's COMP node 122 and also the input 140 of a comparator module 110. The COMP node voltage establishes a measure for the amount of error as a criterion voltage that determines which one of the CrM or DCM modules should be activated and its output to be delivered as the output of the circuit 100.

The criterion voltage is also an indication of the amount of energy transferred from the primary side to the secondary side or the energy delivered to the load. The comparator module 110 includes another input 142 where another reference voltage as a threshold voltage is supplied for comparison. The output 144 of the comparator which is coupled to the input 152 of DCM module as well as the input 182 of CrM module provides the selector (SEL) voltage that governs which one of the output 154 of the DCM module or the output 184 of the CrM should selected to be delivered to the input 170 of the driver DR module 112. The output 172 of the driver 112 is coupled to circuit's GATE node 124 which constitutes the output of the circuit.

The GATE output 124 of the circuit 100 is configured to drive the switch, typically a discrete power MOSFET or BJT transistor (not shown) of an AC/DC power converter. The driver 112 amplifies the output signal that drives the switch. The comparator 110 has a hysteresis incorporated into it to ensure the stability of its output 144 and that the forward and backward jumps of its output voltage are based on a curve with hysteresis such that the thresholds for forward and backward jumps are different. The criterion voltage at COMP node 122 which is also applied to the input 150 of DCM module and input 180 of CrM module ensures that the selected module is correctly compensating for the error. A single capacitor 114 or a combination of the capacitor 114 coupled in series with a resistor (not shown) and coupled between node 122 and ground 116 provides the necessary compensation for the circuit. In an example, the dual-mode circuit 100 is coupled to a PFC circuitry and additionally corrects the power factor for each mode of operation.

The circuit 100 includes an extra module 108 called on-time skew that can affect one of the outputs of the CrM or the DCM module. In this example, the extra module affects the output of the DCM module and is located between the output of DCM and input of DR such that output 154 of DCM is coupled to input 160 of module 108 and output 162 of module 108 is coupled to input 170 of the DR module. This module modifies the DCM generated waveform (e.g., pulses), such that the on-time of the waveform is reduced that leads to a higher criterion voltage at the COMP node 122 when DCM module is selected which in turn increases the dynamic range of the AC/DC power converter that uses this circuit. In another example (not shown) the on-time skew module is located between the CrM module and the DR module modifies the CrM generated waveform (e.g., pulses), such that the on-time of the waveform is increased and the same effect is achieved. As an example, the elements disclosed in circuit 100 as well as the PFC circuitry are included in an integrated circuit chip configured for controlling an AC/DC power converter.

Figure 2:
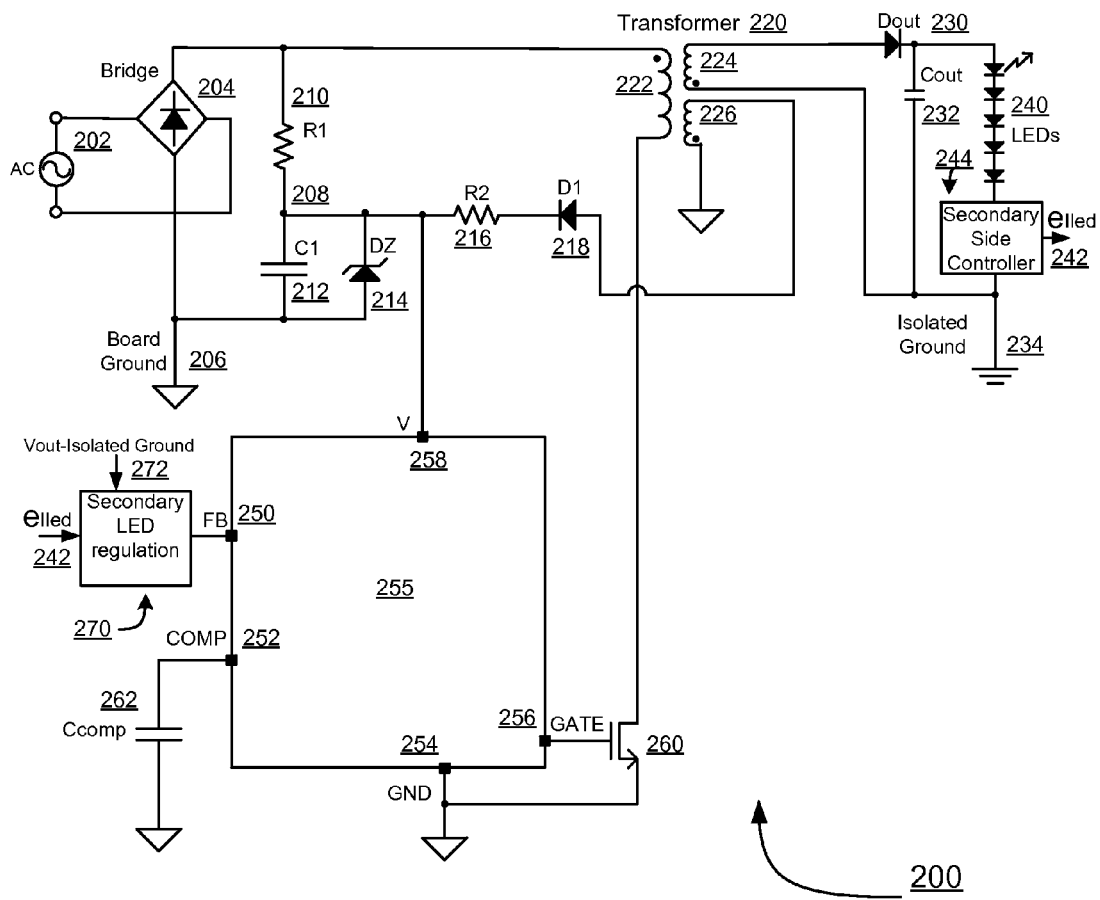
FIG. 2 is an example circuit diagram of a dual-mode, isolated AC/DC power converter with a LED string as its load.

FIG. 2 is an example of an isolated AC/DC power converter circuit 200 that incorporates the dual-mode primary controller circuit of FIG. 1 as its module 255. The isolated AC/DC power converter circuit incorporates a transformer 220 that magnetically couples the primary side 222 with the secondary side 224. The primary side 222 is part of the input circuit with an input ground 206 and the secondary side 224 is part of the output circuit with and isolated output ground 234.

The output of circuit 200 includes the secondary winding 224 of the transformer that is inversely coupled to its primary winding and is coupled to a diode 230's anode from one side and the isolated ground 234 from the other side. A load 240 in parallel with an output capacitor 232 is coupled between the cathode of diode 230 and the ground 234. The example circuit has a string of LEDs as its load. Another example of the circuit 200 includes a secondary side controller 242 coupled to the load. The secondary controller is configured to measure one or more of the output parameters including output voltage, output current, or output current error.

The input of circuit 200 includes the primary winding 222 of the transformer that is coupled to the ground 206 through a switch 260 from one side and to the rectifying Bridge 204 from the other side where the Bridge 204 is supplied through an alternating current line 202. At initial power up and before the required voltage is supplied to module 255 through its node 258 to begin producing the pulses at node 256, the input capacitor 212 is charged through resistor 210. When the voltage at node 208 reaches to a point that module 255 starts operating, the switch 260 starts turning on and off and causes a current to start flowing at the output side as well as the auxiliary winding 226. The current produced by the auxiliary winding 226 also charges the input capacitor 212 through the diode 218 and resistor 216, and during normal operation of the power converter this current is the main source to charge capacitor 212 and provide the current at node 258. A Zener diode 214 coupled in parallel with capacitor 212 clamps the voltage at node 258. The secondary and auxiliary windings 224 and 226 are inversely coupled to the primary winding 222 and because of the orientation of the diodes 230 and 216, the current through both windings 224 and 226 flow when the switch 260 turns off.

The module 255 incorporated in circuit 200 is an example of a dual-mode controller circuit displayed in FIG. 1 where its node 254 is coupled to primary side ground 206. The module 255 is configured to supply the pulses adapted for either CrM or DCM mode of operation and additionally satisfies PFC requirements and delivers the pulses at its output node 256 where it turns the switch 260 on or off. In an example, the signals from the secondary controller 242 are applied to a Secondary LED Regulation module 270. In this example the signals are the output current error and output voltage. The module 270 creates a voltage proportional to its inputs and applies it to FB node 250 of the module 255. The module 255 utilizes the error and provides a criterion voltage at COMP node 252. Based on this error criterion, module 255 delivers one of the waveforms adapted for DCM or CrM and switches between these waveforms when required by the output load. As displayed in FIG. 2, a single capacitor 262 or a combination of the capacitor 262 coupled in series with a resistor (not shown) and coupled between node 252 and ground 206 provides the necessary compensation for the module.

Another example of the same circuit 200 includes a module 255 that includes the on-time skew. The on-time skew module affects the output waveform of one of the CrM module or the DCM module and modifies the waveform (e.g. pulses) where the modification includes a change of the time a switch coupled to the module 255 is turned on. As an example, the on-time skew affects the output of the DCM module and modifies the pulses such that the on-time of the pulses are reduced that leads to a higher criterion voltage at the COMP node 252 when DCM module is selected which in turn increases the dynamic range of the controller 242 of the AC/DC power converter.

The example circuit 200 is an isolated AC/DC power converter. If an inductor replaces the transformer of the isolated AC/DC power converter, the input and the output of the converter do not stay isolated anymore and share the same ground and the same module 255 can be used for the output control of this new circuit.

Figure 3:
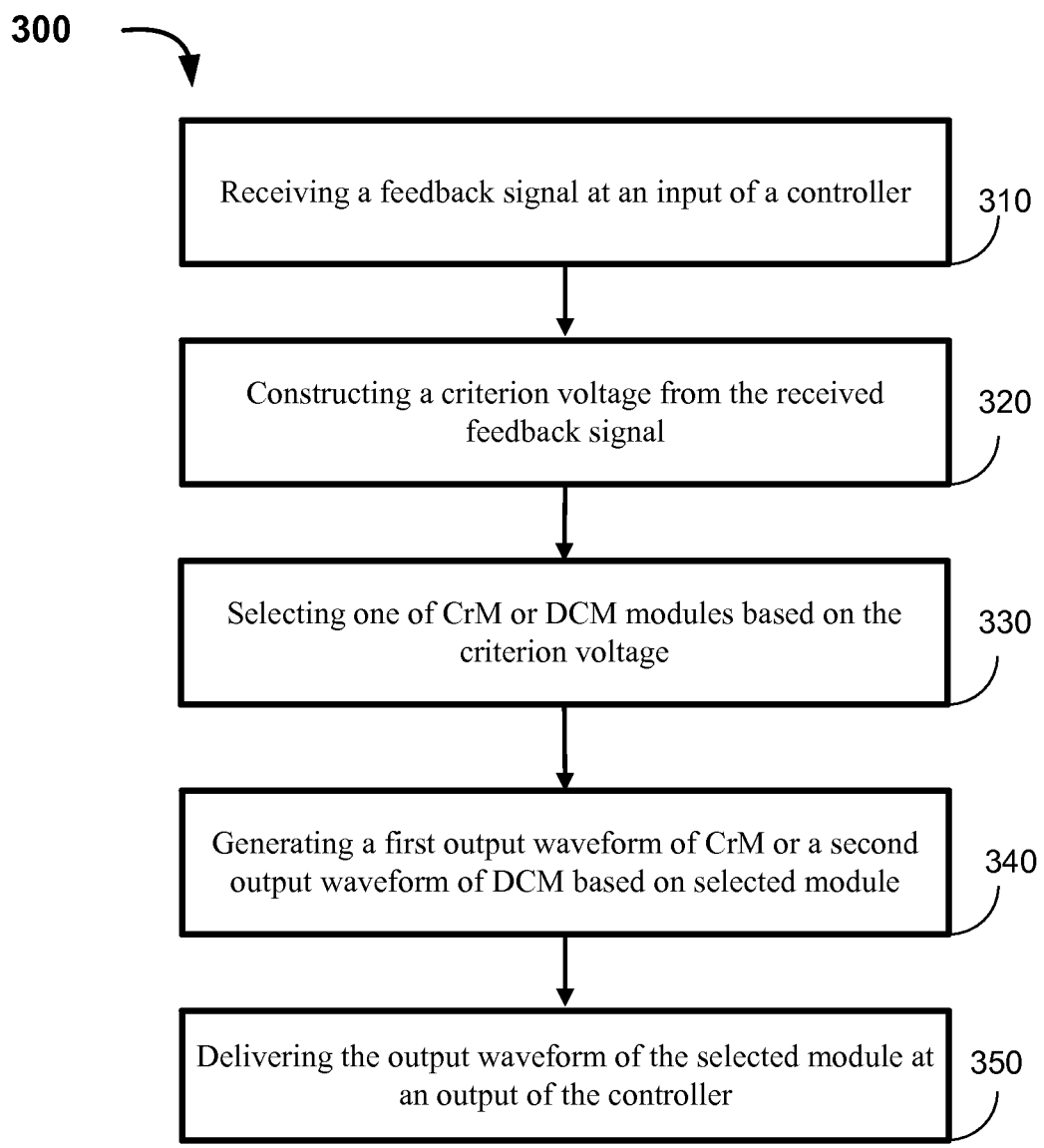
FIG. 3 is an example flow diagram of a method for driving the controller of an example circuit as in FIG. 1.

FIG. 3 is a flow diagram of process 300 implemented on a controller as the example circuit 100 of FIG. 1 intended for delivery of a waveform to control a switch for the output control of a power converter. The controller receives a feedback signal in step 310 and generates, from the received feedback signal, a criterion voltage in step 320. In the next steps 330 and based on the criterion voltage, the controller selects one of the CrM or the DCM modules. In step 340 and based on the selected module the first waveform configured for the CrM operation of a power converter or the second waveform configured for the DCM operation of a power converter is generated. Delivering the output waveform of the selected module at the output of the controller is in step 350.

Figure 4:
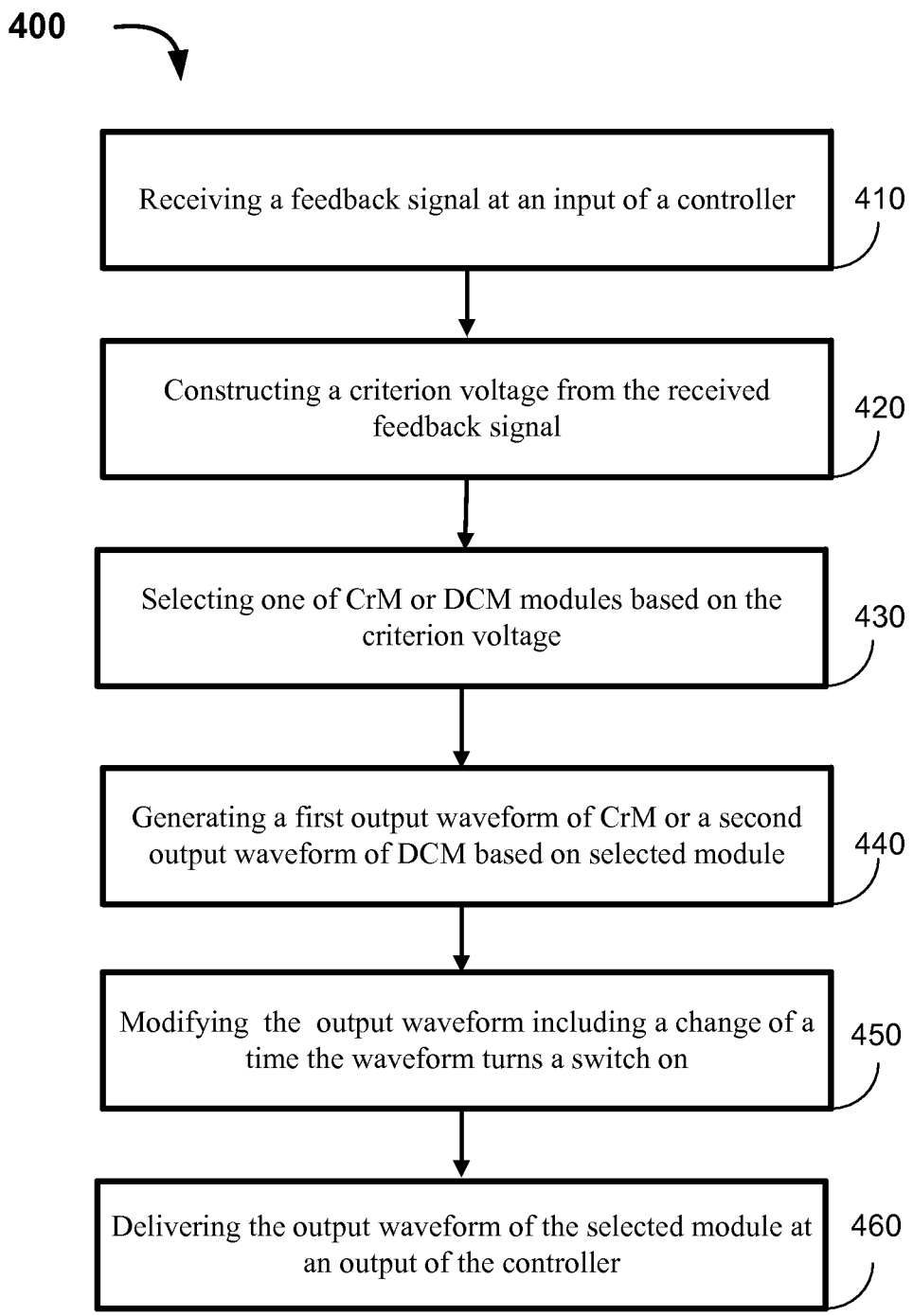
FIG. 4 is an example flow diagram of a method as in FIG. 3 with the additional step of skewing the on-time of the DCM waveform.

FIG. 4 is a flow diagram of process 400 implemented on a controller as the example circuit 100 of FIG. 1 intended for delivery of a waveform to control a switch for the output control of a power converter. The steps 410-440 are similar to steps 310-340 of FIG. 3. In step 450 a skewing process modifies the waveform generated by the selected module where the modification includes a change of the time the output waveform is configured to turn the switch on. In step 460 the output waveform of the selected module is delivered at the output of the controller.

Figure 5:
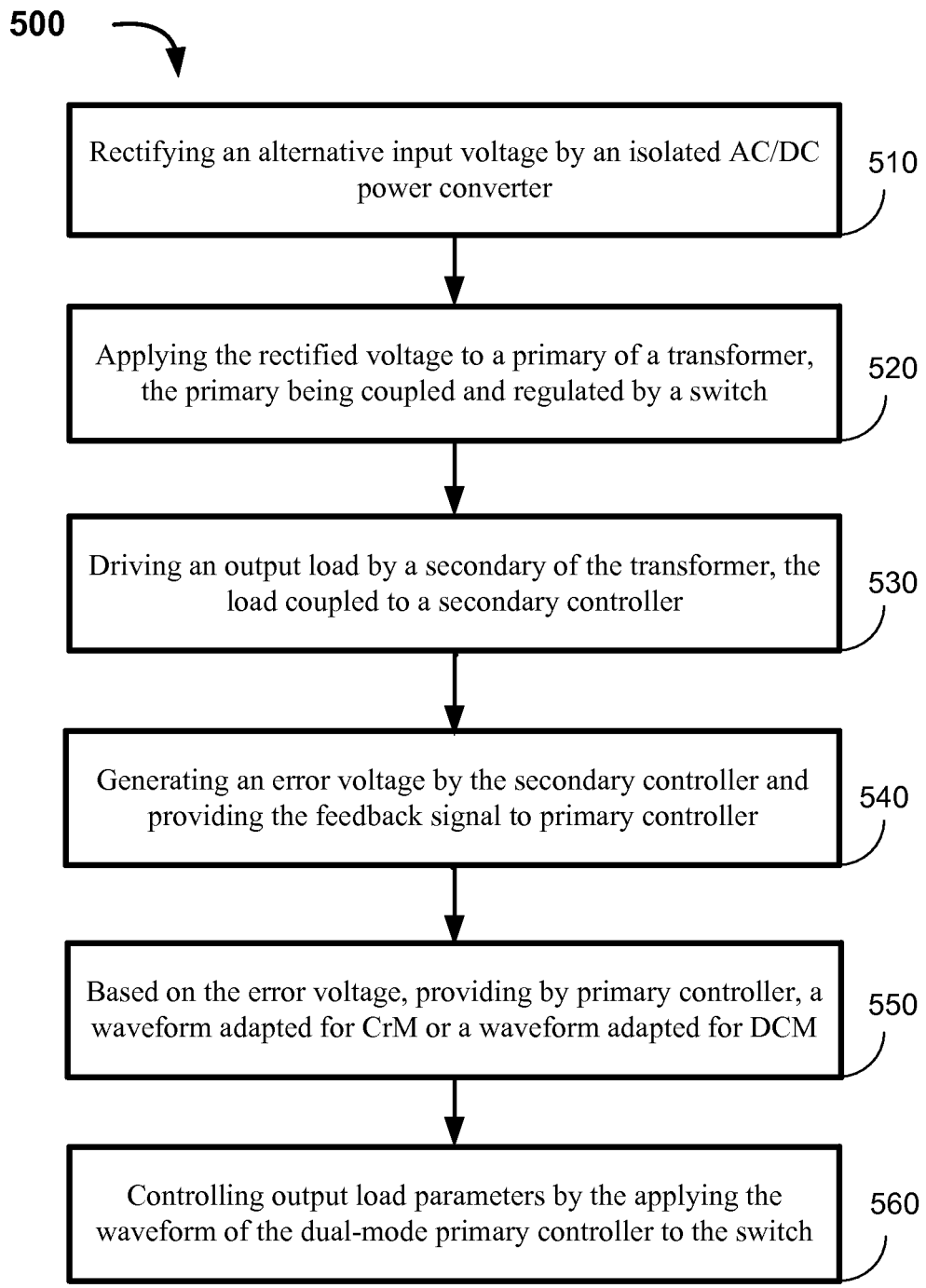
FIG. 5 is an example flow diagram of a method for controlling a dual-mode, isolated AC/DC power converter of an example circuit as in FIG. 2.

FIG. 5 is a flow diagram of a process 500 for controlling an isolated AC/DC power converter utilizing a dual-mode controller circuit and implemented on an example circuit 200 displayed in FIG. 2. In step 510, at the input of the power converter an alternating input voltage is rectified. In step 520, the rectified voltage is applied to the primary side of a transformer where the primary side of the transformer is also coupled and governed by a switch. The secondary of the transformer is driving an output load in step 530 where the output load is coupled to a secondary controller. In step 540, an error voltage is generated by the secondary controller and the error voltage is provided to the dual-mode controller. Based on the error voltage of step 540, the dual-mode controller at the primary side generates in step 550 either a waveform adapted for CrM or a waveform adapted for DCM operation of the power converter. In step 560, the waveform generated by the primary controller is applied to the switch noted in step 520.

Figure 6:
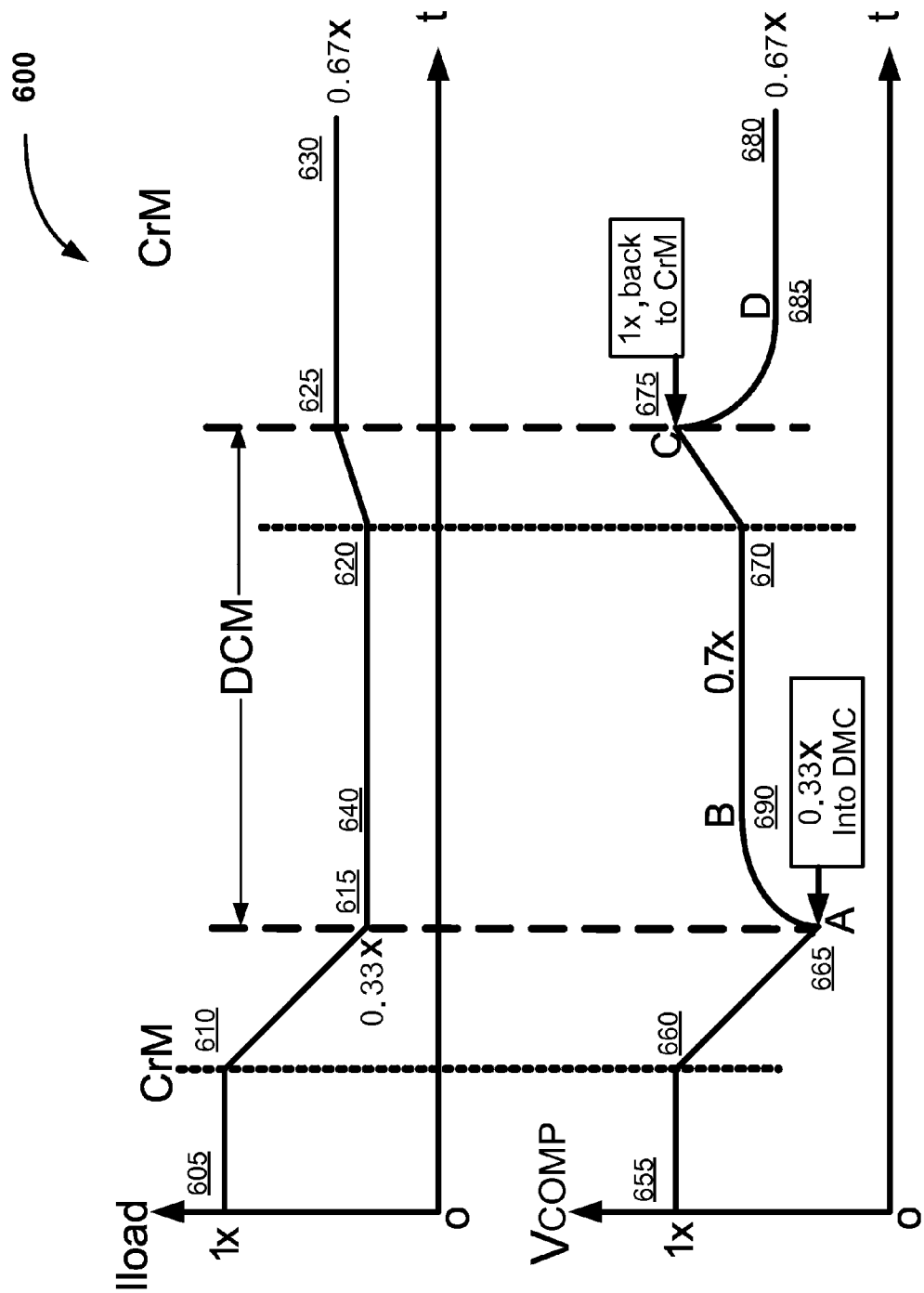
FIG. 6 is an example of a timing diagram of the output current and the criterion voltage of an AC/DC power converter.

In another example, the dual-mode controller of FIG. 2 incorporates the on-time skew module coupled to the DCM module when controlling the output of an isolated AC/DC power converter. The graphs in FIG. 6 display an example timing diagram 600 of the output load's current Iload and also the voltage of the COMP node (VCOMP) of the dual-mode controller. The graphs are the current of the LEDs 240 and the voltage of node 252 in FIG. 2. The 1× of Iload refers to the current of a full load. The 1× of VCOMP is the nominal voltage of the COMP node at the full load. In the region at the left side of the point 665 of VCOMP and its corresponding point 615 of Iload, the comparator of FIG. 1 selects the CrM for the operation of the power converter. In this region the voltage VCOMP and the load current change from 1× to an example of 0.33×. This region which gives an example dynamic range of 3 in CrM mode would be the same whether the on-time skew module is incorporated or it is not. When the load drops and the output current goes below or at the example 0.33×, VCOMP drops to 0.33× and the comparator of FIG. 1 commands to change CrM to DCM for the operation of the power converter. When the load further drops and if there is no on-time skew module for DCM, the load current and the VCOMP further drop the remainder of the range (not shown).

The on-time skew block in FIG. 1 skews the on-time and modifies the waveform generated by the DCM module. In an example that the DCM generated waveform is a series of pulses, the on-time skewing reduces the duration of the pulses that turn on the switch coupled to the output of the dual-mode controller. The points 685 and 690 on the VCOMP graph are related to the situations that the skewing technique is effective. By purposely reducing the on-time of the pulses, the transformer of FIG. 2 does not find enough on-time to regulate to the example values of 0.33× for the load current. The AC/DC converter regulates by itself to point 690 which increases the VCOMP to adjust for the 0.33× of load current. The VCOMP at point 690 for example becomes 0.7× which is higher than 0.33× at point 665. In other words the voltage VCOMP is pushed up to increase the on-time and as the result to allow more operational range for further load drop. In the DCM region between point 690 and point 675, when the load increases, VCOMP increases and when it becomes 1×, the comparator of FIG. 1 selects CrM over DCM. The on-time skewing not affecting the CrM, VCOMP drops to a point 685 (e.g., 0.67×), giving more room for the load current to further increase in CrM. Thus, implementing the on-time skew module increases the dynamic range for the output control of the power converter.

What is claimed is:

1. A dual-mode controller circuit comprising:
    an output (GATE) node configured to generate a driving waveform for driving a switch;
    an integrator module adapted to receive a feedback signal of a voltage or a current and configured to generate a criterion voltage;
    a critical conducting mode (CrM) module adapted to receive the criterion voltage and configured to generate a first output waveform;
    a discontinuous conducting mode (DCM) module adapted to receive the criterion voltage and configured to generate a second output waveform;
    a selector coupled to the integrator and the CrM and the DCM modules, wherein the selector is adapted to receive the criterion voltage, and wherein based on the criterion voltage the selector is configured to select one of the CrM or the DCM modules, and wherein the first and second output waveform of the selected CrM or DCM module is coupled to the GATE node to provide the driving waveform; and
    an on-time skew module, wherein the on-time skew module is configured to modify one of the first output waveform or the second output waveform, and wherein the modification includes a change of a time the driving waveform is configured to turn the switch on.

2. The circuit of claim 1, wherein the CrM module is coupled to the integrator module, and wherein the first output waveform is adjusted by the criterion voltage and is configured for a CrM operation of a power converter.

3. The circuit of claim 1, wherein the DCM module is coupled to the integrator module, and wherein the second output waveform is adjusted by the criterion voltage and is configured for a DCM operation of a power converter.

4. The circuit of claim 1, further comprising:
    a threshold voltage coupled to the selector, wherein the selection of one of CrM or DCM modules includes comparing the criterion voltage with the threshold voltage, and wherein the selection includes a curve with hysteresis.

5. The circuit of claim 1, wherein the GATE node is coupled to the switch and drives the switch.

6. The circuit of claim 1, wherein the circuit is a part of an integrated circuit incorporated in a chip.

7. The circuit of claim 6, wherein the circuit is added to a chip including a power factor correction circuitry.

8. The circuit of claim 1, wherein the first output waveform and the second output waveform are a series of pulses.

9. The circuit of claim 1, wherein the on-time skew module modifies the first output waveform and the modification includes an increase of the time the driving waveform is configured to turn the switch on.

10. The circuit of claim 1, wherein the on-time skew module modifies the second output waveform and the modification includes a reduction of the time the driving waveform is configured to turn the switch on.

11. The circuit of claim 1, wherein the dual-mode controller circuit is coupled to a power converter for output control.

12. The circuit of claim 11, wherein the power converter is an AC/DC power converter.

13. The circuit of claim 12, wherein the AC/DC power converter is an isolated AC/DC power converter.

14. The circuit of claim 1, further comprising:
    a feedback (FB) node adapted to receive the feedback signal and coupled to a first input of the integrator, wherein a first reference signal of the voltage or the current is coupled to a second input of the integrator, and wherein the criterion voltage is an integral of a difference of the feedback signal and the first reference signal;
    a compensation (COMP) node coupled to the integrator and adapted to receive the criterion voltage; and
    a gate driver (DR) module
        coupled to the GATE node,
        coupled to the CrM and the DCM modules,
        adapted to receive the output waveform of the selected CrM or DCM module, and
        configured to deliver the driving waveform at the GATE node.

15. The circuit of claim 14, wherein the integrator module is configured to amplify the difference of the feedback signal and the first reference signal.

16. The circuit of claim 14, wherein a compensating circuit including a capacitor is coupled between the COMP node and a ground.

17. A method of providing a driving waveform as an output of a dual-mode controller configured for driving a switch, the method comprising:
    receiving a feedback signal of a voltage or a current at an input node of the dual-mode controller;
    constructing a criterion voltage from a received feedback signal;
    selecting, based on the criterion voltage, one of a critical conducting mode (CrM) module or a discontinuous conducting mode (DCM) module;
    generating, based on a selected module, one of a first output waveform of the CrM module or a second output waveform of the DCM module;
    delivering the generated output waveform at an output of the dual-mode controller to provide the driving waveform, where the method is performed by one of hardware processors or circuits; and
    wherein one of the first output waveform of the CrM module or the second output waveform of the DCM module is modified, and wherein the modification includes a change of a time the driving waveform is configured to turn the switch on.

18. The method of claim 17, wherein the output of the dual-mode controller is coupled to the switch and drives the switch.

19. The method of claim 18, wherein the switch is combined into the dual-mode controller and the combination is part of an integrated circuit incorporated in a converter chip.

20. The method of claim 17, wherein constructing the criterion voltage includes integrating a difference of the received feedback signal and a first reference signal of a voltage or current.

21. The method of claim 17, wherein selecting includes comparing the criterion voltage with a threshold voltage, and wherein the selection includes a curve with hysteresis.

22. The method of claim 17, wherein generating the first output waveform includes adjusting the first output waveform by the criterion voltage, and wherein the first output waveform is configured for a CrM operation of a power converter.

23. The method of claim 17, wherein generating the second output waveform includes adjusting the second output waveform by the criterion voltage, and wherein the second output waveform is configured for a DCM operation of a power converter.

24. The method of claim 17, wherein the received feedback signal is directly proportional to one or more output parameters including:

an output current error,
an output voltage error,
an output current, and
an output voltage.

25. The method of claim 17, wherein the first output waveform is modified and the modification includes an increase of the time the driving waveform is configured to turn the switch on.

26. The method of claim 17, wherein the second output waveform is modified and the modification includes a reduction of the time the driving waveform is configured to turn the switch on.

27. The method of claim 17, wherein the first output waveform and the second output waveform are a series of pulses.

28. The method of claim 17, wherein the dual-mode controller is coupled to a power converter for output control.

29. The method of claim 28, wherein the power converter is an AC/DC power converter.

30. The method of claim 29, wherein the AC/DC power converter is an isolated AC/DC power converter.

* * * * *